(12) United States Patent
Hanssen

(10) Patent No.: US 9,182,958 B2
(45) Date of Patent: Nov. 10, 2015

(54) SOFTWARE CODE PROFILING

(71) Applicant: Atmel Corporation, San Jose, CA (US)

(72) Inventor: Ingar Hanssen, Trondheim (NO)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 14/017,047

(22) Filed: Sep. 3, 2013

(65) Prior Publication Data

US 2015/0067661 A1 Mar. 5, 2015

(51) Int. Cl.
G06F 9/44 (2006.01)
G06F 9/45 (2006.01)

(52) U.S. Cl.
CPC ...................................... *G06F 8/443* (2013.01)

(58) Field of Classification Search
USPC .................................. 717/124–131, 140–141
IPC .............. G06F 11/30,11/3604, 11/362, 11/3668
See application file for complete search history.

(56) References Cited

U.S. PATENT DOCUMENTS

| | | | | |
|---|---|---|---|---|
| 5,450,586 | A * | 9/1995 | Kuzara et al. ................. | 717/124 |
| 5,713,006 | A * | 1/1998 | Shigeeda ....................... | 711/170 |
| 5,944,841 | A * | 8/1999 | Christie ....................... | 714/38.11 |
| 6,049,666 | A * | 4/2000 | Bennett et al. ................. | 717/130 |
| 6,381,735 | B1 * | 4/2002 | Hunt ............................. | 717/158 |
| 6,668,372 | B1 * | 12/2003 | Wu ............................... | 717/130 |
| 6,728,955 | B1 * | 4/2004 | Berry et al. .................... | 717/158 |
| 6,826,748 | B1 * | 11/2004 | Hohensee et al. .............. | 717/130 |
| 6,934,935 | B1 * | 8/2005 | Bennett et al. ................. | 717/127 |
| 6,941,545 | B1 * | 9/2005 | Reese et al. ................... | 717/130 |
| 6,954,923 | B1 * | 10/2005 | Yates et al. .................... | 717/130 |
| 6,957,422 | B2 * | 10/2005 | Hunt ............................. | 717/130 |
| 7,013,456 | B1 * | 3/2006 | Van Dyke et al. ............. | 717/130 |
| 7,574,702 | B2 * | 8/2009 | Goldin et al. ................. | 717/148 |
| 7,926,043 | B2 * | 4/2011 | Vaswani et al. ............... | 717/130 |
| 8,001,417 | B2 * | 8/2011 | Byrne et al. ................... | 714/6.13 |
| 8,539,455 | B2 * | 9/2013 | Berg et al. ..................... | 717/131 |
| 2013/0227531 | A1 * | 8/2013 | Vijayaraghavan et al. ... | 717/130 |

OTHER PUBLICATIONS

Bojnordi et al, "A Programmable Memory Controller for the DDRx Interfacing Standards", ACM Transactions on Computer Systems, vol. 31, No. 4, Article 11, pp. 1-31, 2013.*
Pandey et al, "Flag and Register Array Based High Performance Instruction Set Architecture of Embedded Processor", IEEE, pp. 716-720, 2013.*
Ciobanu et al, "Scalability Study of Polymorphic Register Files", IEEE, pp. 803-808, 2012.*

(Continued)

*Primary Examiner* — Anil Khatri
(74) *Attorney, Agent, or Firm* — Fish & Richardson P.C.

(57) ABSTRACT

An on-chip function call aware software code profiling counter system and method is disclosed. When building software code a compiler/tool-chain can modify prologues and epilogues of functions to add instrumentation code which uniquely identifies the function. Each function included in the instrumented source code tree is assigned a unique identifier (ID) by the compiler/tool-chain. Writing a unique ID for a function to a register starts profiling for the function. The profiling is performed by a counter that counts the number of instruction cycles since the last unique ID was written to the register. When a unique ID for a next function to be profiled is written to the register, the old register value and the counter value are latched to one or more buffers and the counter is cleared to start the next count sequence for the next function to be profiled.

20 Claims, 4 Drawing Sheets

(56) References Cited

OTHER PUBLICATIONS

Lee et al, "Delay-Line Based Embedded Memory Access Time Measurement: Circuit, Implementation and Characterization Techniques", IEEE, pp. 259-264, 2012.*

Tsai et al, "An All-Digital High-Precision Built-In Delay Time Measurement Circuit", IEEE, pp. 249-254, 2008.*

Wang et al, "DRAM-Based Statistics Counter Array Architecture With Performance Guarantee", IEEE, vol. 20, No. 4, pp. 1040-1053, 2012.*

* cited by examiner

SOFTWARE CODE PROFILING

TECHNICAL FIELD

This disclosure relates generally to hardware and software tools for software code profiling.

BACKGROUND

Software code profiling is a form of dynamic program analysis for aiding software program optimization. Profiling measures memory or time complexity of a program, the usage of particular instructions or frequency and duration of function calls. Profiling is achieved by instrumenting either the program source code or its binary executable form using a tool commonly called a code profiler. A number of different techniques may be used by profilers, such as event-based, statistical, instrumented and simulation methods. The output data from a code profiler can be displayed to the user as a set of bar-graphs with % central processing unit (CPU) cycles as a measurement unit. Conventional recording of profiling data relies on instruction trace output or instrumentation of code with logging to off-chip data recorders or post-processors.

SUMMARY

An on-chip function call aware software code profiling counter system and method is disclosed. When building software code a compiler or tool chain can modify prologues and epilogues of functions to add instrumentation code which uniquely identifies the function. Each function included in the instrumented source code tree is assigned a unique identifier (ID) by the compiler/tool-chain. Writing a unique ID for a function to a register starts profiling for the function. The profiling is performed by a counter that counts the number of instruction cycles since the last unique ID was written to the register. When a unique ID for a next function to be profiled is written to the register, the old register value and the counter value are latched to one or more buffers and the counter is cleared to start the next count sequence for the next function to be profiled.

In some implementations, the profiling counter system can be implemented using a dedicated hardware module including hardware counters, adders, registers and memory. In other implementations, a minimal profiling counter system is implemented in hardware and combined with a co-processor for indexing counter arrays and adding count values to the counter arrays. In some implementations, a single channel profiling counter system can be used to profile a single function.

In some implementations, an integrated circuit (IC) device includes a system for software code profiling. The system comprises: a profiling register configured for storing a software function identifier; a time measurement circuit configured for starting and stopping a counter based on signals indicative of a start point and a stop point of the function in source code, where the signals are generated while compiled source code of the function is executing on the IC device; a counter array configured for storing a count indicative of a total execution time for the function; and a data structure configured for storing software function identifiers according to an order of execution of the corresponding functions.

In some implementations, an IC device includes a system for software code profiling. The system comprises: a profiling register configured for storing a software function identifier; a time measurement circuit configured for starting and stopping a counter based on signals indicative of a start point and a stop point of the function in source code, where the signals are generated while compiled source code of the function is executing on the IC device; an interface coupled to the time measurement circuit; and a co-processor coupled to the interface and configured for: obtaining the count from the interface; indexing a counter array to obtain a stored count for the function; and adding the count to the stored count to obtain a total count for the function.

In some implementations, a method of software code profiling in an IC device comprises: obtaining a software function identifier; starting a counter in response to a start signal indicative of a start point of the function in source code, where the start signal is generated while compiled source code of the function is executing on the IC device; detecting a stop signal indicative of a stop point of the function in the source code; responsive to the detecting: indexing a counter array using the function identifier; reading a stored count from the counter array; adding a current count from the counter to the stored count; resetting the counter; and storing the function identifier in a data structure.

In some implementations, a method of profiling software code in IC device, the method comprising: obtaining a software function identifier; starting a counter in response to a start signal indicative of a start point of the function in source code, where the start signal is generated while compiled source code of the function is executing on the IC device; detecting a stop signal indicative of a stop point of the function in the source code; configuring a co-processor in the IC device for: obtaining the count from an interface; indexing a counter array to obtain a stored count for the function; and adding the count to the stored count to obtain a total count for the function.

Other implementations are directed to methods, circuits, systems and computer-readable mediums.

Particular implementations disclosed herein may provide a low-cost system for profiling software code that does not rely on instruction trace output or instrumentation code with logging to off-chip data recorders or post-processors.

DETAILED DESCRIPTION

Figure 1:
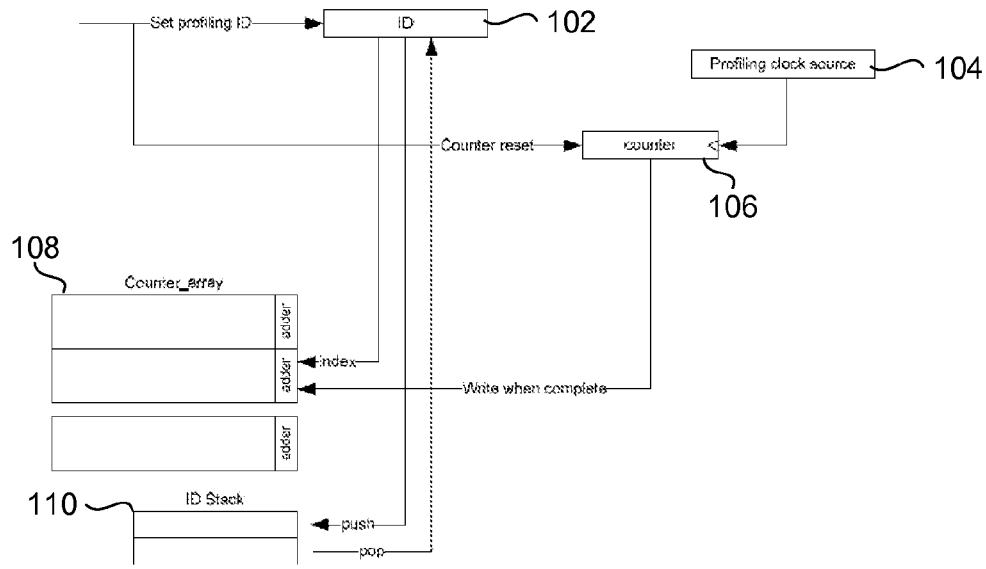
FIG. 1 is a conceptual block diagram illustrating a profiling counter system implemented in dedicated hardware using an internal module or system memory.

FIG. 1 is a conceptual block diagram illustrating a profiling counter system 100 implemented in dedicated hardware using an internal module or system memory. In some implementations, system 100 can include a time measurement circuit that includes profiling identifier (P_ID) register 102, profiling clock source 104, counter 106, counter array 108 and P_ID stack 110.

In some implementations, when building the software code the compiler/tool-chain can modify the prologue and epilogue of each function in the software code to be profiled to uniquely identify the function. The instrumentation can include a single write instruction to write a unique P_ID for the function to P_ID register 102. The P_ID can be a positive integer. P_IDs can be consecutive integers (e.g., 1, 2, 3 . . . N) based on the order the functions are encountered in the source code starting from the beginning of the source code. For example, a first function (e.g., a main{ } function) encountered in the source code could have a P_ID of 1, a next function a P_ID of 2, a next function a P_ID of 3 and so forth. Using a single write instruction for instrumentation will have a minimal impact on time overhead. The user can choose to instrument only parts of the source code or the whole source code tree. The P_ID register 102 can be a memory mapped register in a devices memory map.

In some implementations, profiling is performed by counter 106 counting a number of instruction cycles since the last write operation to P_ID register 102. When a new write to P_ID register 102 is completed the P_ID previously stored in P_ID in register 102 and the new counter value are latched to one or more buffers (e.g., separate buffers) before counter 106 is reset to start the next count sequence for the new P_ID stored in P_ID register 102.

After the counter value is latched, the counter value can be added to the previously accumulated counter value in counter array 108 for the P_ID. The index in this array can be the P_ID or it can be a hash of the P_ID. An example syntax in the programming language "C" could be counter_array[PID]=counter_array[PID]+counter_buffer, where counter_array is a one-dimensional counter array 108, P_ID is an index and counter_buffer holds the counter value to be added to the accumulated counter value stored at counter_array[P_ID]. For example, a first function (P_ID=1) has an accumulated counter value stored at counter_array[1]. Using the above syntax, the total number of cycles spent inside a function is counted and stored in the counter array 108 at a position determined by the value of P_ID. This profiling data can, at any given time, be uploaded to a post-processor (e.g., a personal computer) and presented to a user as a bar graph or any other suitable display.

To handle the case where a function calls another function (i.e., a nested function) or may be interrupted by an interrupt routine there is a need for a data structure P_ID stack 110. P_ID stack 110 can be a last in, first out (LIFO) queue. In some implementations, when a "0" (return value) is written to P_ID register 102, the previous P_ID is "popped" from P_ID stack 110. Any P_ID different from "0" is "pushed" onto P_ID stack 110. P_ID stack 110 can be implemented inside a hardware module of the IC device to increase speed. An example P_ID stack 110 has a stack depth of 32 and consumes 64 bytes of memory, assuming a 16-bit P_ID.

An example stack operation is as follows. A first function P_ID=1 calls a second function P_ID=2, which calls a third function P_ID=3. When P_ID=2 is written to profiling register 102, P_ID=1 is pushed to P_ID stack 110. When P_ID=3 is written to profiling register 102, P_ID=2 is pushed to P_ID stack 110. When P_ID=0 is written to profiling register 102, P_ID=2 is popped from P_ID stack 110 and placed in profiling register 102. When P_ID=0 is again written to profiling register 102, P_ID=1 is popped from P_ID stack 110 and placed in profiling register 102.

In some implementations, additional functionality can be initiated or accessed upon writing "0" to P_ID register 102. For example, a feature can be implemented to compare the measured counter value in counter_buffer to a maximum value stored in a separate array. If the measure value is larger than the maximum value, the maximum value can be updated so that the longest execution time for a function can be determined.

In some implementations, upon a "0" being written to P_ID register 102, a separate call counter function can count how many times each function in the software program is called. A post-processor (e.g., personal computer) can then calculate an average cycle count per function execution.

To allow continuous non-intrusive operation, in some implementations an overflow bit can be assigned to the counter value for each P_ID. When the overflow bit is set it can be signaled to an interface for an on-chip debug or event system. When the on-chip debug system or event system reads the overflow bit, the overflow bit can be automatically cleared (e.g., set to zero). A separate array can be used to store overflow bits which can be aggregated into a single bit that indicates that at least one count for a function has overflowed. A separate bit can indicate loss of data when double overflow occurs. After the debug system reads the counter array, the array can be cleared (e.g., set to zero).

In some implementations, an alternative approach to indexing and adding counter values is for counter 106 to be pre-loaded with the accumulated counter value stored in counter array 108, such that the accumulated counter value is added to the current counter value during the counting stage rather than as a separate, post-counting, stage in the profiling process.

An example syntax in "C" for counter pre-loading is given by:

```
counter_array[last_PID] = counter; // store the last value
counter = counter_array[P_ID]; // pre-load the counter for the next
P_ID.
```

This latter approach enable use of an execution time trigger point to break the code execution, signal an event to the user or cause a system reset when a function has exceeded a maximum time. An example syntax in "C" for a trigger point is given by:

```
If (counter >= max_limit_array[P_ID])
    trigger_event (max_time_exceeded, P_ID);
```

Figure 2:
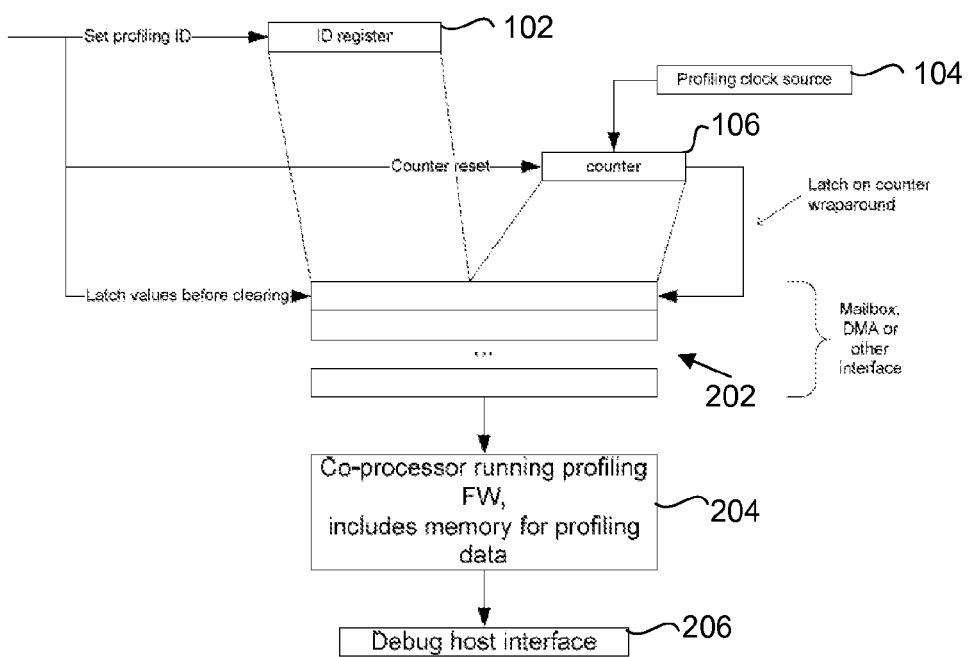
FIG. 2 is a conceptual block illustrating a profiling counter system implemented using a co-processor.

FIG. 2 is a conceptual block illustrating a profiling counter system 200 implemented using a co-processor. In some implementations, system 200 can include a time measurement circuit that includes P_ID register 102, profiling clock source 104, counter 106 and interface 202. Co-processor 204 handles indexing and adding operations, including accessing accumulated values from memory adding current counter values and writing the new accumulated counter value to counter_array 108. Host interface 206 provides an interface between co-processor 204 and post-processing device, such as an on-chip debug system.

Interface 202 between counter 106 and P_ID register 102 can be a mailbox system, a queue, direct memory access (DMA) or another interface with a certain amount of buffering. Counter 106 and P_ID may be merged into one 32-bit word, where for example 8 bits are used for P_ID and 24 bits are used for counter values.

In some implementations, on-chip profiling can use a set of arrays or an array of "structs" to keep values, including but not limited to: 1) a counter temporary array for storing interruptions and function calls within functions; 2) a max value array for storing the maximum execution times; 3) a total array for storing total number of cycles for each P_ID; 4) a call counter array for storing number of times each P_ID is called; and 5) an overflow bit array for storing the overflow bit for each. In a practical system these arrays can be implemented in system memory or in local memory of the co-processor if a limited number of P_IDs is supported.

In some implementations, a separate memory interface can be implemented when using system memory. The separate memory interface can be configured to handle system memory bus access delays (e.g., memory read access time, bus arbitrations, etc.). If delay caused by the separate memory interface influences the counter value, the separate memory interface can include logic that measures the delay caused by the separate memory interface and adds the delay to the counter value. Accounting for system memory bus access delays may occur, for example, in implementations where the counter is pre-loaded with a previous counter value, as described above.

Figure 3:
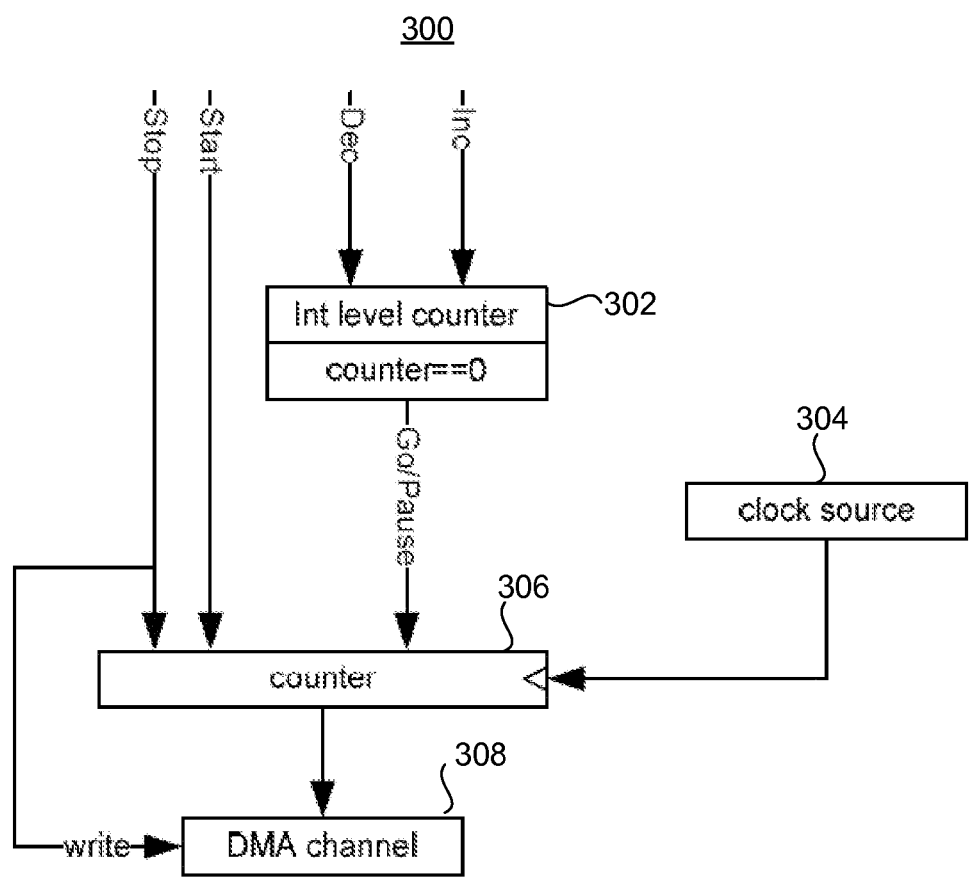
FIG. 3 is a conceptual block diagram illustrating a profiling counter system for a single channel.

FIG. 3 is a conceptual block diagram illustrating a profiling counter system 300 for a single channel. In some implementations, system 300 can include a time measurement circuit that includes interrupt level counter 302, clock source 304 and counter 306. System 300 can also include DMA channel 308. System 300 can be implemented using internal memory of a hardware module with a limited number of P_IDs that can be monitored. "Single channel" means monitoring one function.

Referring to the operation of system 300, system 300 will start counting when a START bit is written. The write instruction can be in a prologue of a function or any other desired location in the code where the user may want to measure time consumption. Counter 306 will keep counting until a STOP bit is written. Interrupt level counter 302 can be used to pause the counting if interrupts are detected. Interrupt level counter 302 will be incremented by one at the start of each interrupt prologue and will be decremented by one at each return from an interrupt. By using a counter instead of single bit, multiple priority levels can be supported (a high priority interrupt interrupting a low priority one). Counter 306 will continue counting when the interrupt level counter is zero. When the STOP bit is written the result can be written to a memory buffer using DMA. After each pass through the instrumented code, the counter value is stored separately and can be transferred to a post-processor that is embedded in the code on the IC device or sent to a host system (e.g., personal computer) for calculating average max/min values or other analysis functions.

Example Processes

Figure 4:
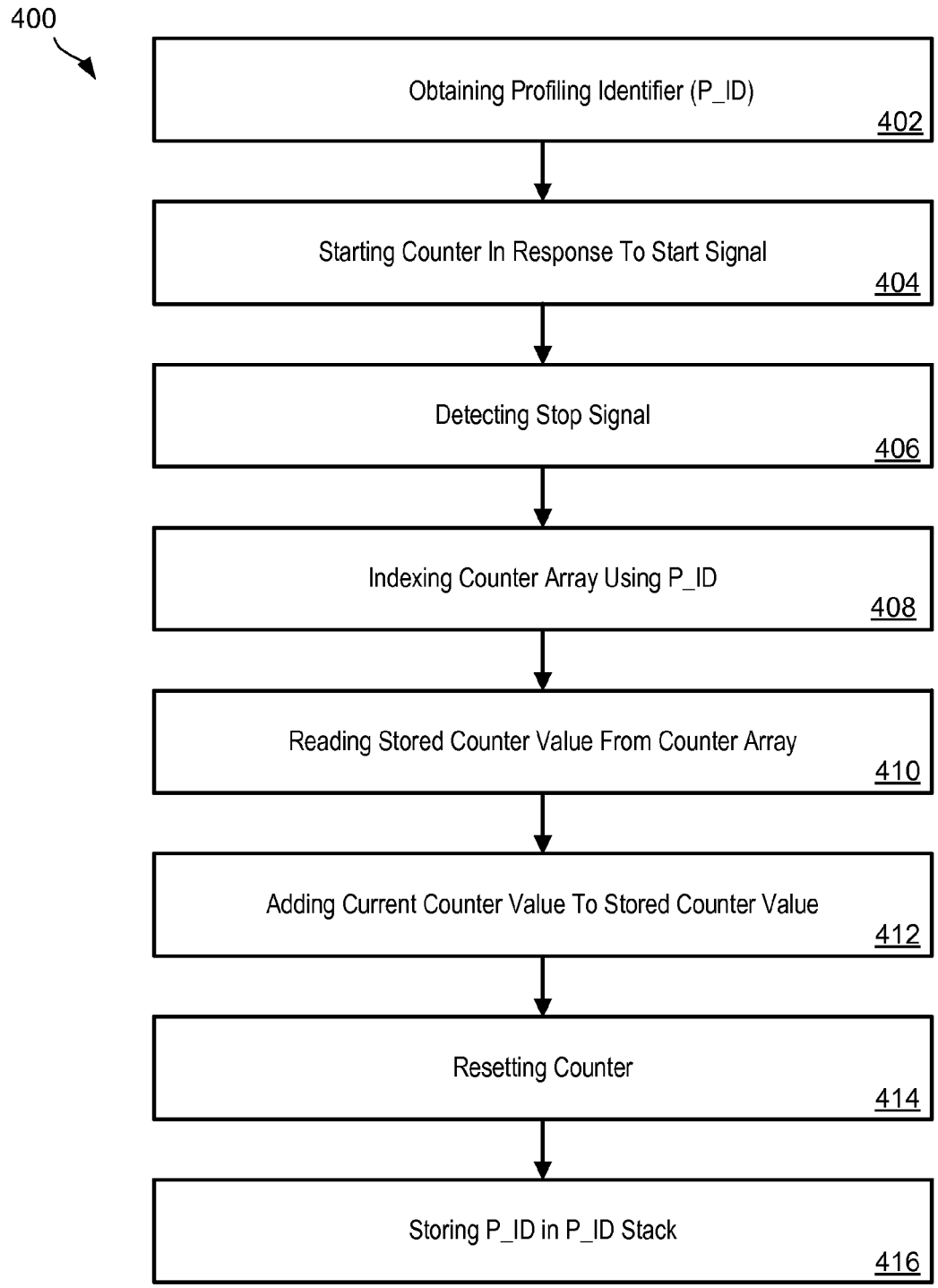
FIG. 4 is a flow diagram of a process of profiling software code using the profiling counter system described in reference to FIG. 1.

FIG. 4 is a flow diagram of a process 400 of profiling software code using the profiling counter system described in reference to FIG. 1.

In some implementations, process 400 can begin by obtaining a software function identifier (402). Process 400 can continue by starting a counter in response to a start signal indicative of a start point of the function in source code (404). The start signal can be generated while compiled source code of the function is executing on the IC device.

Process 400 can continue by detecting a stop signal indicative of a stop point of the function in the source code (406).

Process 400 can continue by indexing a counter array using the function identifier (408), reading a stored counter value from the counter array (410), adding a current counter value from the counter to the stored counter value (412), resetting the counter (414), and storing the function identifier in a data structure (416). For example, the data structure can be a LIFO queue.

Figure 5:
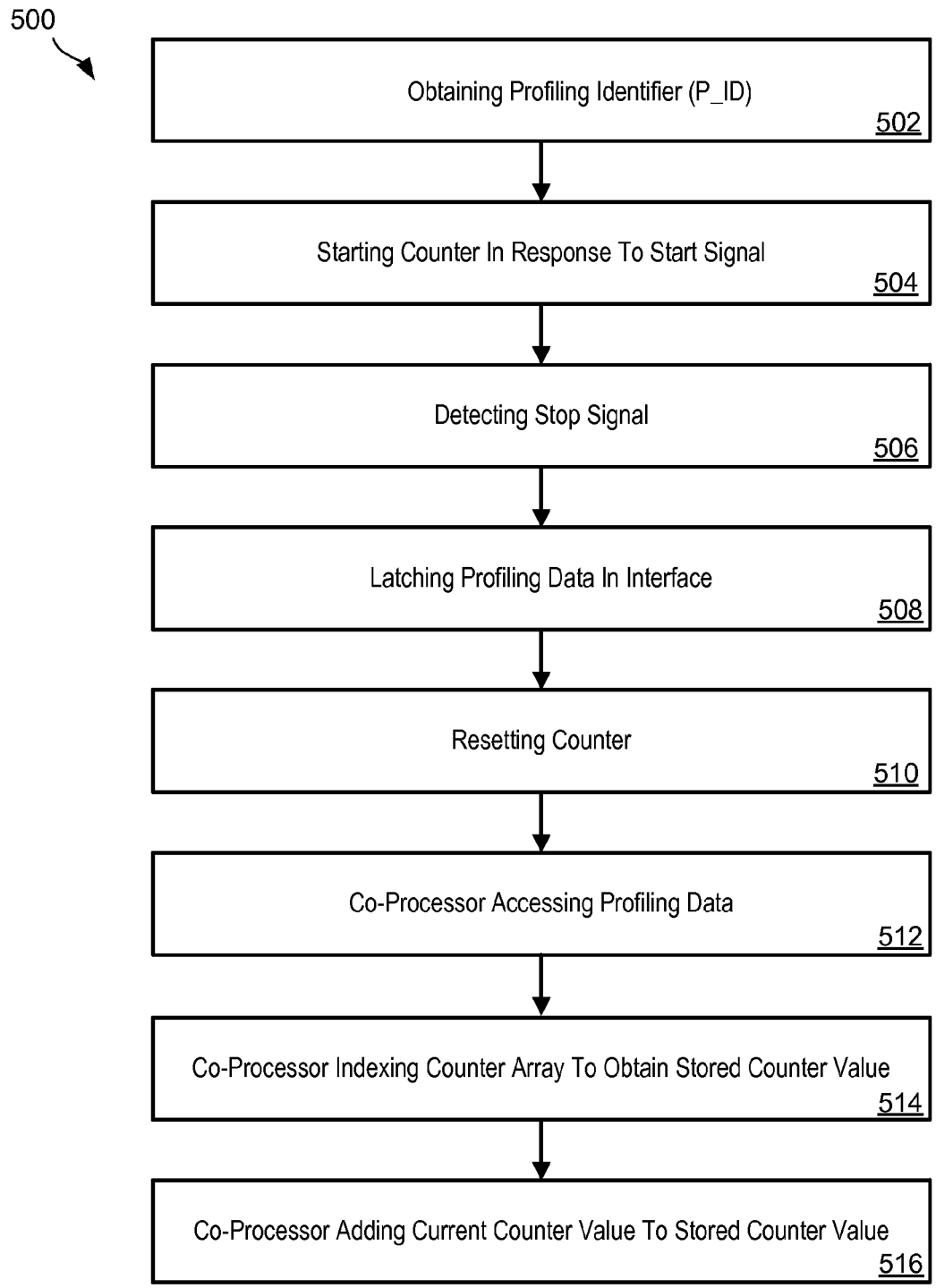
FIG. 5 is a flow diagram of a process of profiling software code using the profiling counter system described in reference to FIG. 2

FIG. 5 is a flow diagram of a process 500 of profiling software code using the profiling counter system described in reference to FIG. 2.

In some implementations, process 500 can begin by obtaining a software function identifier (502). Process 500 can continue by starting a counter in response to a start signal indicative of a start point of the function in source code (504). The start signal can be generated while compiled source code of the function is executing on the IC device.

Process 500 can continue by detecting a stop signal indicative of a stop point of the function in the source code (506).

Process 500 can continue by configuring a co-processor in the IC device for latching the profiling data in an interface (508), resetting the counter (510), using a co-processor to access the latched profiling data (512), using the co-processor to index a counter array to obtain a stored counter value for the function (514), and using the co-processor to add the counter value to the stored counter value to obtain a total counter value for the function (516).

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. An integrated circuit (IC) device including a system for software code profiling, the device comprising:
 a profiling register configured for storing a software function identifier;
 a time measurement circuit configured for starting and stopping a counter based on signals indicative of a start point and a stop point of the function in source code, where the signals are generated while compiled source code of the function is executing on the IC device;
 a counter array configured for storing a counter value indicative of a total execution time for the function; and
 a data structure configured for storing software function identifiers according to an order of execution of corresponding functions.

2. The device of claim 1, where the software function identifier is provided by a compiler or tool chain.

3. The device of claim 1, where the counter array is indexed by the software function identifier.

4. The device of claim 1, where the data structure is a last in first out (LIFO) stack.

5. The device of claim 1, where the counter array stores data indicating counter wraparound.

6. The device of claim 1, further comprising:
 an adder configured to add the counter value for the function to a previous counter value for the function stored in the counter array.

7. The device of claim 1, where the IC device is a microcontroller unit.

8. An integrated circuit (IC) device including a for software code profiling, the system device comprising:

a profiling register configured for storing a software function identifier;

a time measurement circuit configured for starting and stopping a counter based on signals indicative of a start point and a stop point of the function in source code, where the signals are generated while compiled source code of the function is executing on the IC device;

an interface coupled to the time measurement circuit; and a co-processor coupled to the interface and configured for:

obtaining a counter value from the interface;

indexing a counter array to obtain a stored counter value for the function; and adding the counter value to the stored counter value to obtain a total counter value for the function.

9. The device of claim 8, where the software function identifier and the counter value are latched by one or more latches in the interface before the counter is reset.

10. The device of claim 9, where the counter is configured to generate a signal indicating a counter wraparound, and data indicating a number of counter wraparounds is latched before the counter is reset.

11. The device of claim 8, further comprising:

a host interface coupled to the interface and configured to provide profiling data to an on-chip debug or event system.

12. The device of claim 8, where the software function identifier is provided by a compiler or tool chain.

13. The device of claim 8, where the counter array is indexed by the software function identifier.

14. The device of claim 8, where the IC device is a microcontroller unit.

15. A method of profiling software code in an integrated circuit (IC) device, the method comprising:

obtaining, by the IC device, a software function identifier;

starting, by the IC device, a counter in response to a start signal indicative of a start point of the function in source code, where the start signal is generated while compiled source code of the function is executing on the IC device;

detecting, by the IC device, a stop signal indicative of a stop point of the function in the source code;

responsive to the detecting:

indexing, by the IC device, a counter array using the function identifier;

reading, by the IC device, a stored counter value from the counter array;

adding, by the IC device, a current counter value from the counter to the stored counter value;

resetting, by the IC device, the counter; and storing, by the IC device, the function identifier in a data structure.

16. The method of claim 15, where the software function identifier is provided by a compiler or tool chain.

17. The method of claim 15, further comprising:

detecting a counter wraparound; and storing data indicative of the counter wraparound in the counter array.

18. A method of profiling software code in an integrated circuit (IC) device, the method comprising:

obtaining, by the IC device, a software function identifier;

starting, by the IC device, a counter in response to a start signal indicative of a start point of the function in source code, where the start signal is generated while compiled source code of the function is executing on the IC device;

detecting, by the device, a stop signal indicative of a stop point of the function in the source code;

configuring, by the device, a co-processor in the IC device for:

obtaining, by the device, a counter value from an interface;

indexing, by the device, a counter array to obtain a stored counter value for the function; and adding, by the device, the counter value to the stored counter value to obtain a total counter value for the function.

19. The method of claim 18, where the software function identifier and the counter value are latched by one or more latches in the interface before the counter is reset.

20. The method of claim 19, where the counter is configured to generate a signal indicating a counter wraparound, and data indicating a number of counter wraparounds is latched before the counter is reset.

* * * * *